United States Patent [19]
Hasegawa et al.

[11] Patent Number: 5,490,320
[45] Date of Patent: Feb. 13, 1996

[54] METHOD OF MAKING A POSITIVE ELECTRODE FOR LITHIUM SECONDARY BATTERY

[75] Inventors: Masaki Hasegawa; Yasuhiko Bito, both of Osaka; Shuji Ito, Akashi; Hiroyuki Murai; Yoshinori Toyoguchi, both of Osaka, all of Japan

[73] Assignee: Matsushita Electric Industrial Company, Ltd., Osaka, Japan

[21] Appl. No.: 72,971

[22] Filed: Jun. 4, 1993

[30]     Foreign Application Priority Data

| Jun. 4, 1992 | [JP] | Japan | 4-143980 |
| Aug. 4, 1992 | [JP] | Japan | 4-207732 |
| Sep. 11, 1992 | [JP] | Japan | 4-242920 |
| Dec. 8, 1992 | [JP] | Japan | 4-327652 |

[51] Int. Cl.$^6$ .................... H01M 4/32; H01M 4/26
[52] U.S. Cl. .................. 29/623.1; 429/223; 423/594
[58] Field of Search ............ 429/223; 252/182.1; 423/594; 29/623.1

[56]     References Cited

U.S. PATENT DOCUMENTS 5,264,201  11/1993  Dahn et al. .................... 423/594

OTHER PUBLICATIONS

Lawrence D. Dyer et al., "Alkali–Metal–Nickel Oxides of the Type MNiO$_2$", *J. Am. Chem. Soc.*, vol. 76, at 1499–1503 (Mar. 20, 1954).
P. G. Bruce et al., "Vacancy diffusion in the intercalation electrode Li$_{1-x}$NiO$_2$", *Solid State Ionics*, vol. 57, at 353–358 (1992). (no month).
J. R. Dahn et al., "Structure and electrochemistry of Li$_{1+y}$NiO$_2$ and a new Li$_2$NiO$_2$ phase with the Ni(OH)$_2$ structure", *Solid State Ionics*, vol. 44, at 87–97 (1990). (no month).
W. Li et al., "Crystal structure of Li$_x$Ni$_{2-x}$O$_2$ and a lattice–gas model for the order–disorder transition", *Physical Review B*, V. 46, No. 6, at 3236–3246 (Aug. 1, 1992).
G. Dutta et al., "Chemical Synthesis and Properties of Li$_{1-\alpha-x}$Ni$_{1-\alpha x}$Ni$_{1-\alpha}$O$_2$ and Li[Ni$_2$]O$_4$", *Journal of Solid State Chemistry*, vol. 96, at 123–131 (1992). (no month).
T. Ohzuku et al., "Synthesis and Characterization of LiNiO$_2$ (R3m) For Rechargeable Nonaqueous Cells", *Chemistry Express*, vol. 6, No. 3, at 161–164 (1991). (no month).
T. Ohzuku et al., "New Route to Prepare LiNiO$_2$ For 4–Volts Secondary Lithium Cells", *Chemistry Express*, vol. 7, No. 9, at 689–692 (1992). (no month).
Dai 33 Kai Denchi Toronkai Koen Yoshishu (Symposium), Sep. 16–18, 1992, Summary of Presentations, Tsutomu Ohzuku et al., "An Approach to Secondary Nonaqueous Lithium Cell (I) Synthesis and Characterization of LiNiO$_2$", 1A07, pp. 13–14.
Dai 33 Kai Denchi Toronkai Koen Yoshishu (Symposium), Sep. 16–18, 1992, Summary of Presentations, Hajime Arai et al., "Synthesis and characterization of LiNiO$_2$ as a cathode material for secondary lithium battery", 1A11, pp. 21–22.
T. Ohzuku et al., "Study of metal oxide composite containing Li(I). Synthesis and characterization of LiNiO (R3m) for rechargeable nonaqueous cells.", Abstract of 58th Japanese Electrochemical Conference, published Apr., 1991.

*Primary Examiner*—John S. Maples
*Attorney, Agent, or Firm*—Ratner & Prestia

[57]     ABSTRACT

A lithium secondary battery comprising a positive electrode a double oxide of lithium and nickel wherein said double oxide is formed by burning a mixture of a nickel compound such as nickel carbonate, and a lithium compound such as lithium nitrate, at an atomic ratio of Li/Ni of from >1.0 to 1.4, in either air or oxygen, and a method of manufacturing the same.

4 Claims, 2 Drawing Sheets

METHOD OF MAKING A POSITIVE ELECTRODE FOR LITHIUM SECONDARY BATTERY

BACKGROUND OF THE INVENTION

1. Field of the Invention

The present invention relates to a positive electrode for a lithium secondary battery using lithium as the negative active material. Such a battery is useful as a small, lightweight power source in portable electronic appliances and electric vehicles because of its high voltage and high capacity, ease of manufacture, and a nonaqueous electrolyte lithium secondary battery employing the same positive electrode.

2. Description of the Prior Art

In order to produce batteries having a high performance, a small size and a light weight for use in portable appliances and capable of increasing the mileage of electric vehicles, new battery systems of smaller size and lighter weight are being intensively researched and developed throughout the world. Among them, recently, the lithium secondary batteries which have the properties of high voltage and high capacity and are lighter than other new battery systems. The lithium secondary battery is a common name for various battery systems employing lithium as the negative active material. The negative electrode is available in various forms as follows.

In the simplest form, the metal lithium is itself used as the negative electrode. This results in a battery system with very high voltage, but the life of the battery is limited with regard to cycles of charging and discharging. To circumvent this problem, various negative electrodes mainly composed of metals in which lithium is disposed and alloyed easily at normal temperature, such as aluminum and aluminum alloys including Al-Mn system, alloys composed of lead, tin, bismuth, cadmium and the like represented by Wood's metal, or lithium active material holder in which lithium repeats doping and undoping, such as polyaniline, polypyrrole, other conductive polymers, certain oxides, sulfides, and carbons are used.

In contrast, as the positive active material containing oxides of many transition metals such a $MnO_2$, $TiS_2$, $MoS_2$, $Nb_2O_5$, $Cr_2O_5$, $LiCoO_2$, $LiNiO_2$, $LiFeO_2$, $LiMnO_2$, and $LiMn_2O_4$, chalcogen compounds, and double oxides with lithium have been studied. These compounds have a layer or tunnel crystal structure like intercalation compounds, and contain substances which permit lithium ions to repeat undoping and doping by charging and discharging. Primarily, it is $LiCoO_2$, $LiNiO_2$, and $LiMn_2O_4$ which are not used as the positive active material in nonaqueous electrolyte lithium secondary batteries with high voltage in the 4 V class. These are known as lithium ion storage batteries. In particular, the double oxide of lithium and cobalt, $LiCoO_2$, has a high voltage and capacity, and has been shown to be practical because of its excellent properties such as superior rechargeability. However, cobalt, which is the principal material in these batteries, is relatively expensive, its production is geographically limited. Hence, fluctuation in supply and price due to political circumstances are anticipated.

On the other hand, in double oxides of lithium and manganese or nickel such as $LiMn_2O_4$ or $LiNiO_2$, the manganese or nickel component is relatively inexpensive, and the supply is stable, but the characteristics, in particular, rechargeability are inferior to those of $LiCoO_2$. Therefore, attempts to modify these compounds by investigating methods of synthesis and/or treatments has been undertaken. In particular, $LiNiO_2$ has a similar crystal structure as $LiCoO_2$, although the potential of $LiNiO_2$ is about 0.2 V lower. Attempts have been made to use it as a substitute for $LiCoO_2$ by increasing its capacity and equalizing the energy density.

Methods of synthesis of double oxides of lithium and nickel, such as $LiNiO_2$, are known in the art. Representative compounds are found in the literature as follows. (1) J. American Chemical Soc., Vol. 76, p. 1499 discloses anhydrous lithium hydroxide and metal nickel which are mixed, and heated to react with atmospheric oxygen to generate $LiNiO_2$. When used as the positive active material in a lithium secondary battery, the discharge capacity was low, and the properties were inferior. (2) Chemistry Express, Vol. 6, No. 3, 161, 1991 discloses an aqueous solution of equimolar 4.5 mol/L lithium hydroxide and an aqueous solution of 1.0 mol/L nickel nitrate which are mixed at 60° C., the mixture is stirred for a long time at the same temperature, then filtered, decompressed, dried and solidified to obtain a precursor. This precursor is ground to a powder, which is preburned at 300° C. and then burned at 800° C., and a double oxide of lithium and nickel is obtained. It is reported that this double oxide may be used as a positive active material with relatively high capacity.

Thus, if the method of synthesis of the double oxide is simple, the properties of $LiNiO_2$ as positive active material were inferior. On the other hand, positive active materials with excellent properties require a complicated process for their synthesis involving many steps, a long time, and control of the process was difficult when manufacturing large quantities industrially, i.e. not in the laboratory, and finally, the repeatability of rechargeability is poor.

SUMMARY OF THE INVENTION

The present invention includes a positive electrode to be used in a lithium secondary battery which can be manufactured by a simple process heretofor unknown in the prior art wherein the electrodes is mainly composed of a double oxide of lithium and nickel of high capacity. The invention further includes a method of manufacturing such an electrode. The invention thus provides an nonaqueous electrolyte lithium secondary battery which is excellent in cost performance and has a high energy density equal to that of known batteries wherein the battery of the invention comprises a double oxide of lithium and cobalt as positive active material.

The method of manufacturing the positive electrode includes mixing at least one nickel compound selected from the group consisting of carbonate, nitrate, hydroxide and oxyhydroxide with at least one lithium compound selected from the group consisting of nitrate, carbonate and hydroxide. The lithium compound is in excess of the nickel compound, and the mixture is burned in air or preferably in an oxygen atmosphere. The double oxide of lithium and nickel so obtained is used as the principal component of the positive electrode, resulting in a lithium secondary battery of high energy density of the same quality as a nonaqueous electrolyte secondary battery which comprises the double oxide lithium and cobalt as positive active material. Therefore, a double oxide of lithium and nickel having excellent positive electrode characteristics can be manufactured in a relatively simple process, which does not include a precursor in an aqueous solution as disclosed in the prior art.

DESCRIPTION OF THE PREFERRED EMBODIMENTS

The invention is described in detail below by reference to some of its preferred embodiments and accompanying drawings.

EXAMPLE 1

Anhydrous lithium nitrate and nickel carbonate were weighed at a molar ratio of 1.05:1.0 to provide an atomic ratio of Li/Ni of >1.0, i.e. 1.05, and sufficiently ground and mixed in an alumina ball mill. The mixture was heated in air for a 12 hour period at temperatures of 550°, 600°, 620°, 650°, 680°, 700°, 750°, 800°, 850°, and 900° C. Resulting in a black burned powder consisting of a double oxide powder of lithium and nickel.

Figure 1:
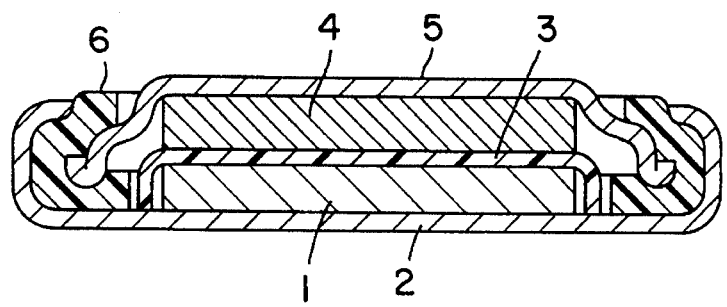
FIG. 1 is a sectional view of a coin-shaped nonaqueous electrolyte lithium secondary battery which is one embodiment of the invention.

Next, a conductive agent (acetylene black) was added to the double oxide powder. A suspension of polytetrafluoroethylene (PTFE) was then added as binder for kneading, and a dried positive material mixture was prepared. The components of the mixture are in a ratio of 7:2:1 of double oxide; acetylene black; PTFE by weight. Exactly 0.15 g of the mixture was pressed and formed into a disk of 17.5 mm in diameter at a pressure of 2 t/cm$^2$ to fabricate the positive electrode resulting in a coin cell in a R2320 size as shown in FIG. 1 (outside diameter 23.0 mm, height 2.0 mm). FIG. 1 is a sectional view of a coin-shaped nonaqueous electrolyte lithium secondary battery, in which a positive electrode 1 is placed in the bottom of a case 2 serving also as positive terminal, and a separator 3 made of microporous polypropylene film is laid over the positive electrode 1. The peripheral margin of the separator 3 is curled so as to envelope the positive electrode 1. A negative electrode 4 of metal lithium (17.5 mm in diameter, identical to the positive electrode 1 with a thickness of 0.8 mm) is pressure-bonded to the inner wall of a cover 5 which serves also as a negative terminal to be formed into one body. On the outer circumference of the cover 5, a polypropylene gasket 6 is fitted. An organic electrolyte comprising lithium perchlorate-propylene carbonate solution (1 mol/L) as a nonaqueous electrolyte is poured into the positive electrode 1, separator 3, and negative electrode 4, all of which is sealed to complete the cell.

The double oxide of lithium and nickel disclosed in Reference 2, and an known double oxide of lithium and cobalt were used as positive electrodes in cells made as described above. All of the cells were tested by charging and discharging under the same conditions as the conventional example and the reference example, respectively.

In these trial cells, since the capacity of negative electrode is sufficiently larger than that of positive electrode, the discharging capacity of each cell is limited by the capacity of positive electrode. Therefore, the positive electrode characteristics can be compared by the cell capacity.

The charging and discharging test was performed at 20° C., a constant current of 0.5 mA, charging was up to 4.3 V and discharging was to 3.0 V for repeated cycles. Then cells from each example were tested, and the averages were compared. The results are shown in Table 1. The capacity maintenance rate in Table 1 refers to the ratio of discharge capacity in 20 cycles to the discharge capacity in 3 cycles, and the higher value means a lower drop in capacity.

As can be seen in Table 1, when burning is conducted at a temperature range of 600° to 850° C. the discharge capacity is larger than that in the prior art. At temperatures lower than 600° C. or higher than 850° C., it seems that double oxides appear not to be formed by burning. In particular, considering the capacity maintenance rate, the preferred burning temperature is in a range of 620° to 680° C., and most particularly, at 650° C.

TABLE 1

| Burning Temperature (°C.) | Discharge capacity (mAh) | | Capacity maintenance rate % |
|---|---|---|---|
| | 3 cycles | 20 cycles | |
| 550 | 11.9 | 8.6 | 72.2 |
| 600 | 17.2 | 15.3 | 89.2 |
| 620 | 18.3 | 18.0 | 98.2 |
| 650 | 18.5 | 18.4 | 99.4 |
| 680 | 18.3 | 18.0 | 98.2 |
| 700 | 17.9 | 17.1 | 95.8 |
| 750 | 16.9 | 15.9 | 93.9 |
| 800 | 15.7 | 14.6 | 92.9 |
| 850 | 14.3 | 12.3 | 88.8 |
| 900 | 10.5 | 7.5 | 71.4 |
| Conventional example | 13.2 | 11.2 | 84.8 |
| Reference example | 19.4 | 18.9 | 97.4 |

EXAMPLE 2

In Example 1, the effect of the burning temperature was examined under conditions where the molar ratio of lithium compound and nickel compound was fixed at 1.05:1.0. In the following example, the effect of molar ratio of lithium compound and nickel compound were investigated.

To 1.0 mol of nickel carbonate, anhydrous lithium nitrate was added at concentrations of 0.9, 1.0, 1.1, 1.2, 1.3, 1.4, and 1.5 mol. The resulting mixtures, having atomic ratios of Li/Ni ranging, in 0.1 increments, from 0.9 to 1.5, were ground and mixed sufficiently, and heated for 12 hours at 650° C. wherein a black burned powder was obtained.

Using the synthesized double oxide powder of lithium and nickel as the positive active material, coin-shaped nonaqueous electrolyte lithium secondary batteries were fabricated under the same conditions as in Example 1, and tested in the charging and discharging test. The results are shown in Table 2. The capacity of the cells was greater when lithium nitrate was added in excess, including the fact that in Example 1 the initial (third cycle) capacity was 18.5 mAh when a mixture of 1.0 mol of nickel carbonate and 1.05 mol of lithium nitrate was burned at 650° C. However, when the amount of lithium nitrate was increased to 1.5 mol, the capacity was significantly lowered. Thus, a lithium secondary battery high capacity can be obtained by mixing lithium nitrate in a range of greater than 1.0 mol to 1.4 mol with 1.0 mol of nickel carbonate. In other words, the atomic ratio of Li/Ni, in accordance with the present invention, is >1.0 to 1.4.

TABLE 2

| Li/Ni molar ratio | Initial capacity (mAh) |
| --- | --- |
| 0.9 | 14.5 |
| 1.0 | 17.4 |
| 1.1 | 19.2 |
| 1.2 | 19.7 |
| 1.3 | 19.6 |
| 1.4 | 18.7 |
| 1.5 | 15.2 |

EXAMPLE 3

To 1.0 mol of nickel carbonate, 1.2 mol of anhydrous lithium nitrate was added, mixed and ground to a powder. The powder was preburned in air for 6 hours at 550° C. and 600° C., and further heated for 6 hours at a temperature range of 600° to 900° C., with 50° C. increments. A black burned powder was obtained. Cells were fabricated in the same manner as in Example 1, and tested for charging and discharging test. The results are shown in Table 3. As can be seen in Table 3 positive active materials of high capacity can be obtained by burning at 600° to 850° C. if the preburning temperature is lower than 600° C. However, when the burning temperature is 900° C., the capacity is lowered and is therefore not useful.

TABLE 3

| Second step burning temperature (°C.) | Preburning temperature (°C.) | |
| --- | --- | --- |
| | 550 | 600 |
| 600 | 16.5 mAh | 17.2 mAh |
| 650 | 17.9 mAh | 18.3 mAh |
| 700 | 17.8 mAh | 18.1 mAh |
| 750 | 17.1 mAh | 17.2 mAh |
| 800 | 16.3 mAh | 16.5 mAh |
| 850 | 15.8 mAh | 15.3 mAh |
| 900 | 14.7 mAh | 12.6 mAh |

EXAMPLE 4

This Example is similar to that described in Example 3 in that, to 1.0 mol of nickel carbonate, 1.2 mol of lithium nitrate was added and mixed. Then, using oxygen instead of air, the mixture was heated at 550°, 600°, 620°, 650°, 680°, 700°, 750°, 800°, 850°, and 900° C. as in Example 1, and a black burned powder was obtained. Cells were fabricated using this powder in the same manner as described in Example 1, and tested in the charging and discharging test. The results are shown in Table 4. Comparing the results with those obtained when air was used (shown in Table 1), when oxygen was used, the discharge capacity and capacity maintenance rate are generally enhanced. The effect of the burning temperature is same Example 1 as in Example 4, that is, 600° to 850° C., preferably 620° to 680° C., and in particular, 650° C. results in the highest capacity.

TABLE 4

| Burning temperature (°C.) | Discharge capacity (mAh) | | Capacity maintenance rate % |
| --- | --- | --- | --- |
| | 3 cycles | 20 cycles | |
| 550 | 14.9 | 11.8 | 79.0 |

TABLE 4-continued

| Burning temperature (°C.) | Discharge capacity (mAh) | | Capacity maintenance rate % |
| --- | --- | --- | --- |
| | 3 cycles | 20 cycles | |
| 600 | 20.7 | 19.0 | 92.0 |
| 620 | 21.8 | 21.5 | 98.5 |
| 650 | 22.0 | 21.9 | 99.5 |
| 680 | 21.9 | 21.5 | 98.4 |
| 700 | 21.6 | 20.8 | 96.2 |
| 750 | 20.9 | 19.8 | 94.9 |
| 800 | 19.7 | 18.4 | 93.6 |
| 850 | 17.8 | 15.9 | 89.5 |
| 900 | 14.7 | 10.8 | 73.4 |

In Examples 1 through 4, nickel carbonate is used as the nickel compound. Nickel carbonate is generally made by adding alkaline carbonate, such as sodium carbonate and potassium carbonate, to an aqueous solution of nickel sulfate, nitrate or the like, to form a sediment followed by washing it in water and then drying. However, this sediment is not a neutral nickel carbonate, but is a basic nickel carbonate having the formula $NiCO_3 \cdot xNi(OH)_2$. In the instant invention, therefore, nickel carbonate refers to this basic nickel carbonate. However, the nickel compound used in the invention is not limited to nickel carbonate alone since nickel nitrate, nickel hydroxide, nickel oxyhydroxide, or their mixtures may be also used. Similarly, the usable lithium compound includes, in addition to lithium nitrate, lithium carbonate, lithium hydroxide, and their mixtures, all of which have similar properties at the burning temperatures, molar ratios and burning atmospheres described in Examples 1 to 4. Thus, using such nickel compounds and lithium compounds, when the lithium compound is mixed with the nickel compound at an atomic ratio of Li/Ni of from >1.0 to 1.4, and the mixture is burned in either air or oxygen at 600° to 850° C., or preferably 620° to 680° C., the double oxide of lithium and nickel so obtained can be used as a positive electrode to generate a nonaqueous electrolyte lithium secondary battery of higher capacity than known in the art.

The trial cells shown in Examples 1 to 4 are coin-shaped lithium secondary batteries which employ metal lithium in the negative electrode. However, in repeated charging and discharging, it is difficult to maintain a long cycle life if specific voltage is used in order to prevent overcharging and overdischarging. Accordingly, to improve the cycle life, a metal or alloy capable of diffusing lithium easily at ordinary temperature can be used as the lithium negative active material holder. Specifically, aluminum, aluminum alloy such as Al-Mn, and alloys of lead, tin, bismuth, cadmium and others represented by Wood's metal are known in the art. They repeatedly form alloys with lithium by charging, and selectively ionize and dissolve the lithium, the basest metal, by discharging. These metals primarily change in volume during charging and discharging, and are therefore suitable for simple shapes such as disk of the negative electrode in the coin-shaped cell. Apart from these metals as the lithium active material holder, many materials have been studied, including conductive polymers such as polyaniline and polypyrrole, certain oxides, sulfides, and carbons. The use of such lithium active material holders is not limited to the coin-shaped cell, in that they may be used also in a negative electrode of a cylindrical cell. In this case, an electrode group consists of spirally wound strip-shaped positive and negative plates around separators.

EXAMPLE 5

A positive material mix paste comprising double oxide as positive active material, acetylene black as conductive material, and PTFE as binder was adhered on both sides of a core sheet of aluminum foil. The composition was dried, pressed by roller, and a positive electrode plate was obtained. A negative electrode plate was made by kneading graphite powder as the lithium active material holder, and methylethylketone solution as a binder composed of vinylchloride-vinylacetate copolymer and applying the resulting paste to both sides of a core sheet of copper foil. This composition was dried and pressed as described above. Each of the strip-shaped positive and negative electrode plates was wound tightly in a spiral to a microporous polypropylene film separator to form the electrodes. The outer circumference of the electrodes was enclosed by a separator, and positive electrode and negative electrode lead plates of the same material as the core sheet were attached to the positive and negative electrode plates.

Figure 2:
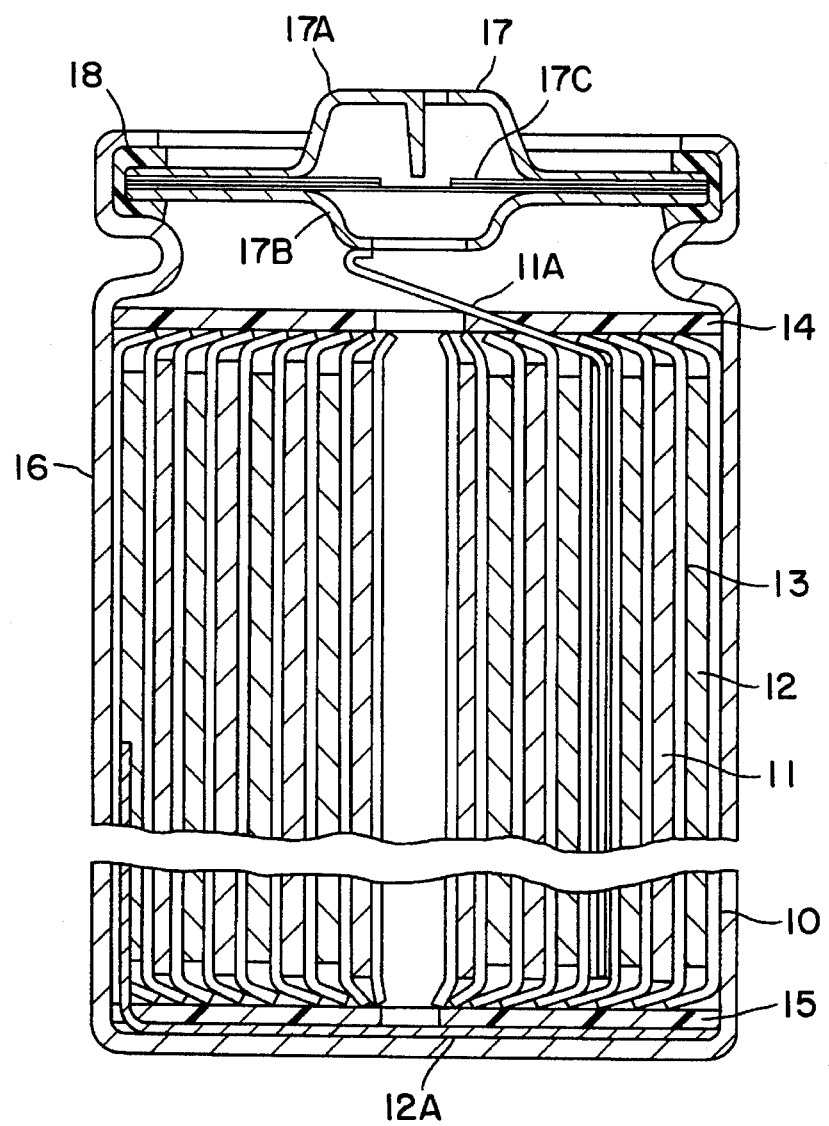
FIG. 2 is a sectional view of a cylindrical (size AA) nonaqueous electrolyte lithium secondary battery which is another embodiment of the invention.

FIG. 2 is a sectional view of a cylindrical nonaqueous electrolyte lithium secondary battery of size AA (R6) made as described above. In FIG. 2, numeral 10 denotes an electrode group comprising a positive electrode plate 11, a negative electrode plate 12 and a separator 13, 11A is a positive electrode lead plate, and 12A is a negative electrode lead plate. The electrode group 10 is put in a case 16, having polyethylene insulation plates 14 and 15 disposed above and beneath thereof, and the negative electrode lead plate 12A is electrically connected to the inner bottom surface of the case 16. Numeral 17 is a cover, and an explosion proof diaphragm 17C is placed between a notched upper cover 17A and a lower cover 17B. A polypropylene gasket 18 is fitted in the periphery of the cover 17 to form in one body. To the lower cover 17B, the positive electrode lead plate 11A is electrically connected. After adding an organic electrolyte (propylene carbonate solution of 1 mol/L lithium perchlorate), the upper edge of the case 16 is curled inside, and the cover 17 is sealed to exclude liquid and air with the gasket 18 to complete a cell.

Figure 3:
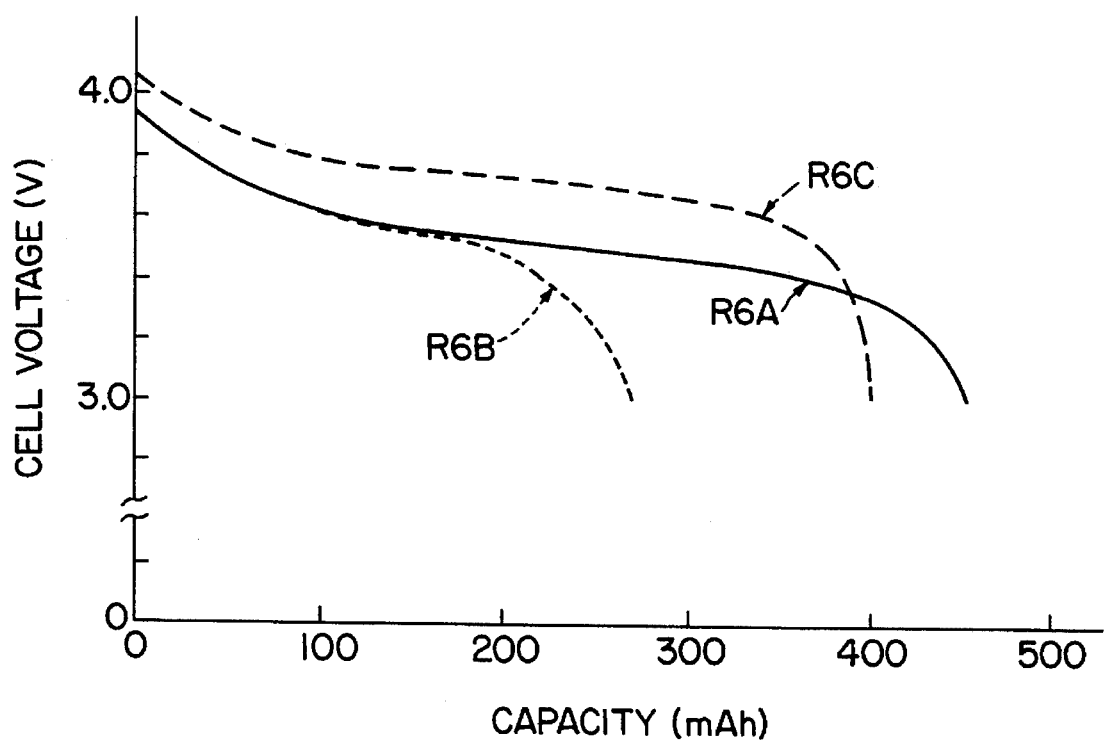
FIG. 3 shows an example of a characteristic discharge curve of the cylindrical battery of the invention compared with a prior art battery.

R6A is a trial cell of the invention using, as the positive electrode plate, the double oxide of lithium and nickel obtained by adding 1.2 mol of lithium nitrate to 1.0 mol of nickel carbonate, mixing sufficiently, and burning for 12 hours in oxygen atmosphere at 650° C. RAB and RAC are trial cells of same size using the positive active materials in the conventional example and reference example in Example 1. Ten cells of each type were tested for charging and discharging at a constant current of 200 mA. The discharge capacities of each of the cells was compared. The representative discharge characteristic curves after five cycles are shown in FIG. 3. RAC which comprises a positive electrode plate mainly composed of the double oxide of lithium and cobalt in the reference example had a mean voltage of about 3.8 V, and a capacity of 400 mAh. In both R6A, the cell of the invention, which comprises a positive electrode mainly composed of double oxide of lithium and nickel, and R6B, the conventional example, the mean voltage was about 3.6 V, and the capacity was 453 mAh and 272 mAh, respectively. Compared with R6C of the reference example which hitherto was known to have the highest energy density, R6A of the invention was about 0.2 V lower in voltage, but was higher in capacity. Furthermore, the energy density (mWh per unit volume) seems to be nearly equal or even superior.

It is understood from the description herein that the invention features a nonaqueous electrolyte lithium secondary battery which has excellent cost performance, which comprises a positive electrode mainly composed of the double oxide of lithium and nickel. This electrode is superior to the positive electrode in the art which is mainly composed of the double oxide of lithium and cobalt.

What is claimed:

1. A method of making a positive electrode for a lithium secondary battery wherein said electrode comprises a double oxide of lithium and nickel said method comprising the steps of burning a mixture of lithium nitrate in combination with at least one nickel compound selected from the group consisting of nickel carbonate and nickel hydroxide, wherein the atomic ratio of Li/Ni in said mixture is from greater than 1.0 to 1.4, at a temperature in the range of 620° to 680° C. to obtain a black burned powder; and adding a conductive agent and a binder to said powder to form said positive electrode.

2. The method of claim 1, wherein said burning is conducted in oxygen.

3. A method of making a positive electrode for a lithium secondary battery wherein said electrode comprises a double oxide of lithium and nickel said method comprising the steps of burning a mixture of lithium carbonate in combination with at least one nickel compound selected from the group consisting of nickel nitrate and nickel oxyhydroxide, wherein the atomic ratio of Li/Ni in said mixture is from greater than 1.0 to 1.4, at a temperature in the range of 620° to 680° C. to obtain a black burned powder; and adding a conductive agent and a binder to said powder to form said positive electrode.

4. The method of claim 3 wherein said burning is conducted in oxygen.

* * * * *